United States Patent [19]

Phillips

[11] Patent Number: 5,544,671
[45] Date of Patent: Aug. 13, 1996

[54] LIGHTWEIGHT, PORTABLE, SELF-OPENING, COLLAPSIBLE SHELTER/CAMPER/STORAGE UNIT

[75] Inventor: Jeffrey O. Phillips, Columbia, Mo.

[73] Assignee: High Gear Inc., Columbia, Mo.

[21] Appl. No.: 296,496

[22] Filed: Aug. 26, 1994

[51] Int. Cl.⁶ .................................................. E04H 15/06
[52] U.S. Cl. .................... 135/88.14; 135/88.16; 135/150
[58] Field of Search .............................. 135/88.13, 88.14, 135/88.15, 88.16, 137, 148, 149, 150

[56] References Cited

U.S. PATENT DOCUMENTS

| | | |
|---|---|---|
| 2,291,900 | 8/1942 | Jimmes . |
| 2,811,725 | 11/1957 | Cence . |
| 3,018,782 | 1/1962 | Hershberger . |
| 3,021,852 | 2/1962 | Hoffman . |
| 3,255,466 | 6/1966 | Weizer . |
| 3,603,330 | 9/1971 | Halldorson et al. . |
| 3,685,061 | 8/1972 | Wray . |
| 3,924,365 | 12/1975 | Orberg . |
| 4,058,133 | 11/1977 | Barr et al. . |
| 4,366,979 | 1/1983 | Pillot ................................. 135/88.16 X |

FOREIGN PATENT DOCUMENTS 618404  4/1961  Canada .
2525539  4/1983  France .

Primary Examiner—Lanna Mai
Attorney, Agent, or Firm—Kokjer, Kircher, Bowman & Johnson

[57] ABSTRACT

A shelter/camper/tent assembly secured to the top of a car or truck or placed on the ground or other suitable surface. The device includes a shell hinged at the front end and collapsible. The shell includes pneumatic cylinders to facilitate opening and closing thereof. Once the shell is opened, support rods pivotally secured to the floor of the shell are extended and threadably secured to pivotal receiving brackets in the ceiling of the shell. The support rods may be directed upward along opposite sides of the entrance to the shell, or arranged in a crossed structure for extra support. The upper and lower shells are secured, through zippers, to a flexible body of the device. The body includes a shroud around the lower portion of the body to keep rain water out of the shell. Resiliently flexible clips mounted on the bottom of the shelter/camper/tent assembly releasably secure the assembly to a supporting structure. Additionally, the outer shell includes handles and wheels. Further, the shell may be constructed with a small hanging cot extending across the interior side of the top shell proximate the back/lower end thereof.

14 Claims, 4 Drawing Sheets

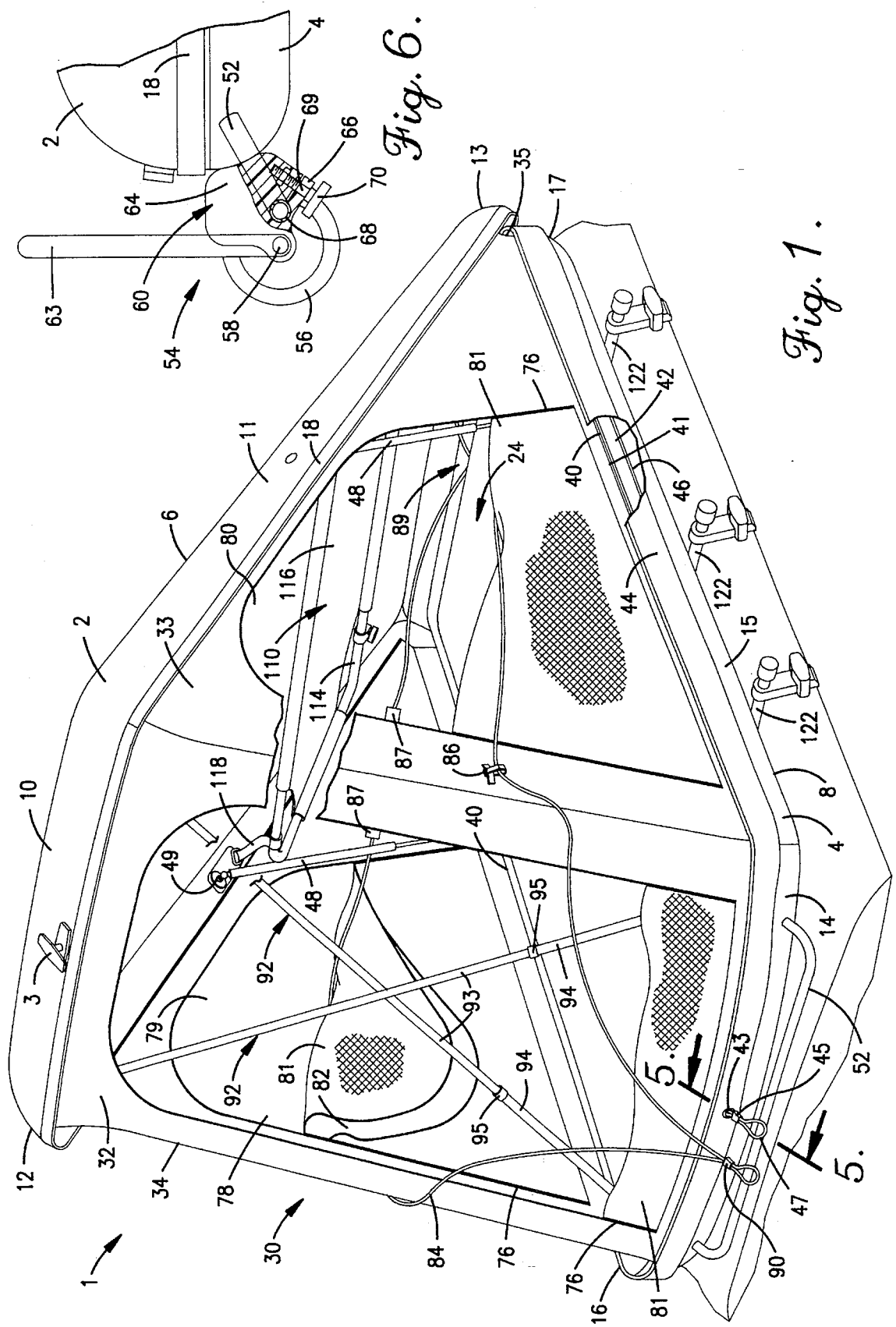

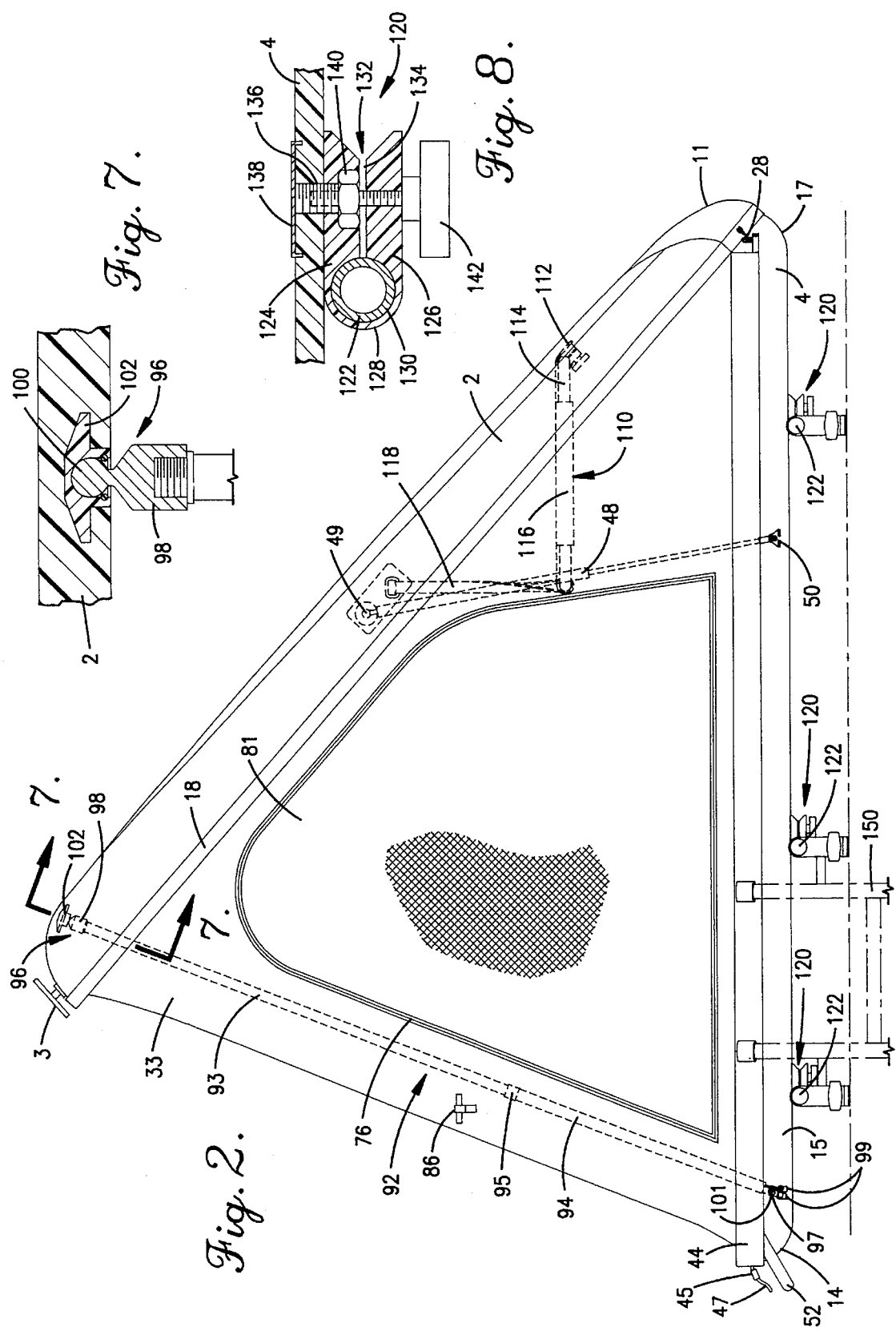

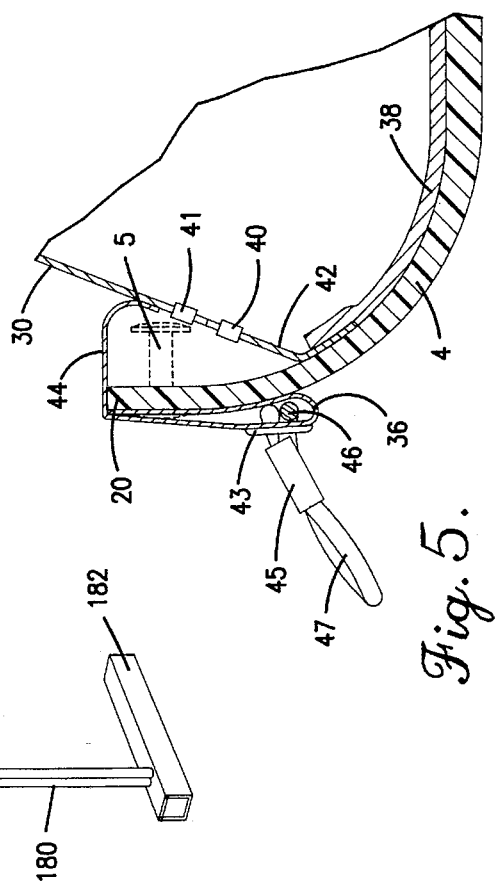
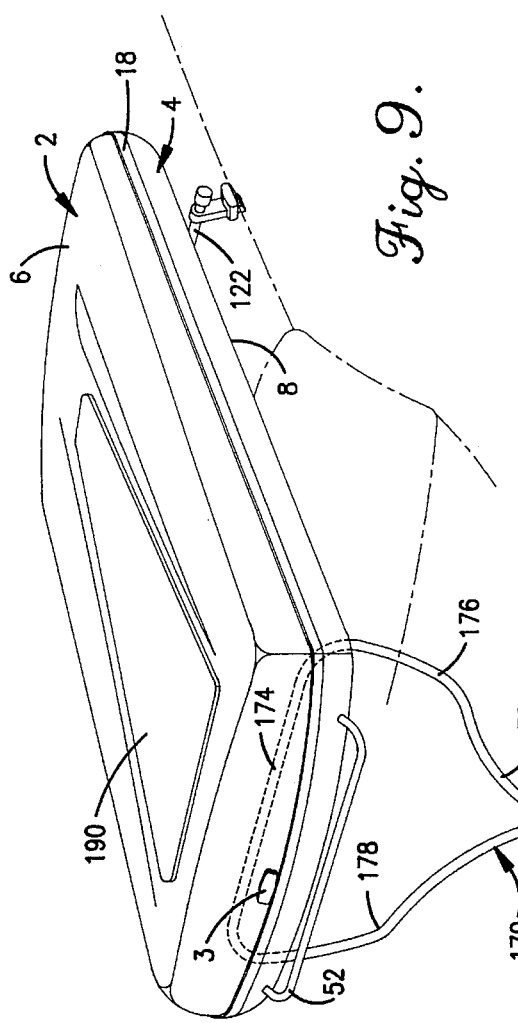
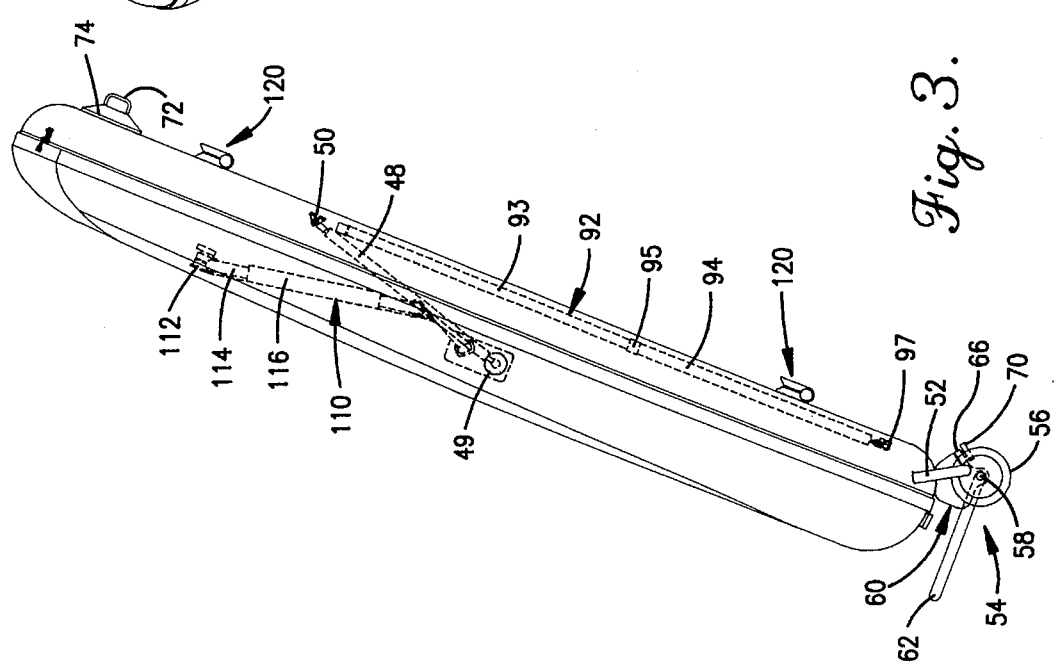

5,544,671

LIGHTWEIGHT, PORTABLE, SELF-OPENING, COLLAPSIBLE SHELTER/CAMPER/STORAGE UNIT

FIELD OF THE INVENTION

The present invention generally relates to a lightweight, portable, self-opening, collapsible shelter/camper (hereafter referred to as shelter/camper assembly) which can be secured to standard roof racks or which can be removed from a vehicle and used as a shelter/camper in other locations; or can be used as a storage unit.

BACKGROUND OF THE INVENTION

In the past, tents and campers have been proposed which are carried upon and supported by vehicles. Examples of such systems may be found in U.S. Pat. No. 2,291,900 (Jimmes); U.S. Pat. No. 2,811,725 (Cence); U.S. Pat. No. 3,018,782 (Hershberger); U.S. Pat. No. 3,021,852 (Hoffman); U.S. Pat. No. 3,255,466 (Weizer); U.S. Pat. No. 3,603,330 (Halldorson); U.S. Pat. No. 3,685,061 (Wray); U.S. Pat. No. 3,924,365 (Orberg); U.S. Pat. No. 4,058,133 (Barr et al.); Canada Pat. No. 618404; and French Pat. No. 2 525 539.

The patent to Orberg discloses a portable, rooftop sleeper for an automobile having upper and lower shells hinged at one end. Pressure clamps are spaced about the sides of the two shells to maintain these shells in a closed condition and to create sufficient pressure to ensure a weather tight closure. A flexible curtain having side walls and an end wall define an interior compartment when the upper shell is raised. A telescopic prop, which is spring loaded, retains the curtain in a taut condition. The side wall contains a zippered opening flap to allow a user to enter the compartment. The side and end walls include windows with roll down interior flap covers. The lower shell retains a mattress and a pillow.

The patent to Hershberger discloses a car top sleeper having a top panel hinged to a car top sleeper. The top panel is secured to straight braces through hinges. The straight braces hold the top panel in an elevated position when the sleeper is opened.

The patent to Cence discloses a compartment attached to the roof of a motor vehicle, wherein the compartment includes collapsible walls which are provided with elastic cables having bars on opposite ends thereof which are attached to loops in the side walls. The elastic cables are used to draw the side walls inwardly when the roof is lowered to a closed position. This drawing action prevents the side walls from collapsing outwardly and thus projecting beyond the roof member thereby requiring manually tucking-in the flexible side walls under the roof after it has been lowered. The collapsible walls are attached to the side walls by means of snaps or any other manner.

The patent to Hoffman discloses a car top tent which includes a cover having a pair of shelves which are disposed at different levels and are suspended therefrom. The shelves are suspended from flexible hangers. When the cover is swung to its closed position, the shelf assembly collapses.

The patent to Halldorson discloses a collapsible tent which includes a bed that may also be used as a table. The tent further includes a second bed which extends laterally at a position intermediate to the ends of the tent.

However, these conventional systems have met with limited success. First, these units are limited to use on the top of a vehicle. In addition, each of these conventional systems is quite difficult to place and secure onto the top of a vehicle. The conventional tent assemblies required at least two strong adult persons to load onto the top of the vehicle and to erect for use. Thus, these structures were limited in utility and inconvenient if not unusable by most campers.

Secondly, these conventional systems experience excessive leaking between the bottom and the side walls. Specifically the front, back and side walls of the conventional tents are secured directly to the floor section thereof. However, this interconnection creates a trough around the tent assembly proximate the bottom portions of the front, back and side walls and the floor of the tent. Hence, during rain storms, this trough collects water which ultimately seeps into the tent.

As noted by Hoffman, while numerous car top tents have been proposed, all include numerous difficulties. These former tents may be broadly divided into two classes, namely those tent structures which are directly elevated and supported on all four sides by suitable props, and car top tents which are pivotally connected at one end of the car top. As noted by Hoffman, the former type of tents still experience the problem of raising the cover and the provision of adequate lightweight supports. This problem has not been solved by the prior art. With respect to the latter type of tent, existing tents have failed to provide the normal space requirements internally due to the limitations of the hinge. While Hoffman attempted to address the space requirement issue, Hoffman utilized an unduly complex hinge mechanism which was extremely difficult to construct, fasten and utilize in practice.

Additionally, the prior art has always necessitated a complex roof and/or bumper mounting system uniquely constructed for use with the "car top camper". In the past, vehicles were not uniform in their mounting characteristics (i.e., roof length, width, load carrying capacity, presence of absence of structural rain gutters, etc.). Thus, previously proposed roof and/or bumper mounting attachment systems offered in conjunction with conventional car top campers, were not sufficiently flexible in design to allow a uniform and safe attachment to a variety of vehicle types. Further, these conventional roof and/or bumper mounting attachments required drilling and other means of irreversibly altering the roof/bumper system or potentially caused damage to the roof of the vehicle (i.e., dimpling, abrading the painting surface, etc.).

Additionally, the conventional systems have been extremely heavy and difficult for even two adult persons to secure upon the vehicle.

Moreover, conventional tents have provided an ineffective manner for cleaning the tent. Specifically, a user must enter the tent structure to clean it. This inconvenience is somewhat attributed to the fact that the front, back and side walls of the tent are securely fastened to the floor and ceiling sections thereof. Thus, to remove dirt from the tent, the user must sweep dirt out the door or use a vacuum cleaner. The flexible side walls could not be removed and as such limited the thorough cleaning of the same. Further, conventional tent structures are not overly rigid once erected. Thus, the tents usefulness is limited in windy weather. This deficiency of the prior art in windy weather is further magnified by the fact that the tent structure is located upon the roof of the vehicle.

Further, the conventional car top campers were solely useful as a tent, while separate cargo carriers were necessary. The conventional tent systems were not useful as cargo carriers since the front and side tent walls were not removable, and the closure of the unit would be hampered if items were stored within. Also, these conventional tents offered restricted appliance use since the only power supply, located therewith, was the vehicle's battery. Generally, these batteries were insufficient as an electrical power source for an extended period of time. Finally, conventional tent systems did not afford sufficient sleeping space. To increase the sleeping area, it was necessary to provide a larger floor space.

A need remains within the industry for an improved shelter/camper assembly which possesses high practical utility together with expanded functionality such that it could serve as a storage unit or be placed on the ground or other surfaces for use as such. It is a primary object of the present invention to meet this need.

SUMMARY OF THE INVENTION

It is an object of the present invention to provide a lightweight, portable, self-opening, collapsible shelter/camper assembly having hard upper and lower shells which also doubles as a storage unit which could be secured to the top of the vehicle.

It is another object of the present invention to provide a collapsible shelter/camper assembly having removable flexible walls.

It is another object of the present invention to provide a collapsible shelter/camper having a water resistant shroud surrounding an intersection between flexible walls and a rigid lower shell.

It is another object of the present invention to improve the space requirements of the instant invention proximate the foregoing/hinged end by utilizing a curved frontal design two small hinges at one end of the assembly opposed by gas shocks and lightweight telescoping props.

It is another object of the present invention to provide a "self-opening action" with extreme stability and improvements in space availability.

It is another object of the present invention to provide a camper/shelter assembly which is mountable upon any widely available widely accepted standard rack system, thereby providing a sturdy system capable of supporting a great deal of weight and providing a camper/shelter quickly attachable to any type of vehicle without the need for permanent alterations to the vehicle.

It is another object of the present invention to provide a camper/shelter assembly which does not require mounting to a vehicle for usage, but can be placed on the ground, on a boat and on a shelter.

It is another object of the present invention to provide an extremely lightweight camper/shelter which affords extreme ease of placement and transportation by one adult.

It is another object of the present invention to provide a quick clamp assembly upon the bottom of the lower shell to enable loading and unloading of the assembly onto standard rack systems by a single person.

It is another object of the present invention to provide a shelter/camper assembly which can be converted to a storage unit or car top carrier by removing the flexible side walls and mattress.

It is another object of the present invention to provide stabilizing bars within the lower shell proximate its front end and extendible to the upper shell in parallel and criss-cross configurations to enhance the structure's rigidity in high winds.

It is another object of the present invention to provide a pull down cot which is pivotally mounted to the interior of the upper shell to provide additional sleeping space without increasing the overall dimensions or interfering with other sleeping quarters.

It is another object of the present invention to provide a solar panel upon an exterior of the upper shell as an independent energy source.

It is another object of the present invention to provide removable wheels and handles upon one of the upper and lower shells to facilitate storage, transport, loading and unloading of the tent assembly.

In summary, the present invention is directed to a shelter/camper/storage unit secured to the top of a boat, recreational vehicle, car, truck or the like, simply placed on the ground or on other suitable material. The device can be secured to standard roof racks which run across the width of the vehicle. The device includes a shell hinged at the front end and collapsible. The shell includes two pneumatic cylinders proximate the back sides of the shell to provide sufficient force to open and to help close it and to hold the shell in an open position while stabilizing braces are secured. Once the shell is opened, the stabilizing braces (pivotally secured to the floor of the shell) are extended and threadably secured to pivotal receiving brackets in the ceiling of the shell. Each brace includes an outer tube which slidably receives an inner tube. Once the braces are installed, the inner and outer tubes are twisted in opposite directions such that a binding fastener therebetween secures the braces to one another.

The braces may be directed upward along opposite sides of the entrance to the shell, or (if in a winding environment) arranged in a crossed fashion for extra support. The upper and lower shells are secured, through zippers, to a flexible tent body. The flexible body, which may be completely removed, includes a nylon shroud around its lower portion which may be folded tightly over the outer edge of the lower shell and secured by an elastic pull-tie to keep rain water out of the shell. The tent body is surrounded by an elastic pull-tie which is pulled on and tightened when closing the shell to enable a single person to close the shell while retaining the entire flexible tent body within the shell. Additionally, one shell may include handles, wheels and a flat tongue to facilitate storage, loading, unloading and moving of the device. The shell may be constructed with a small hanging cot extending across the interior side of the top shell proximate the back/lower end thereof. This cot may be used as a sleeping area for one or two children. As a further option, a small collapsible shelf may be included upon the interior side of the top shell to hold camping items when the shell is in an open position.

The composition of the bottom portion of the camper/shelter allows the invention to be used in settings where no previous system was useful. These unique uses include the use of the invention as a shelter/beach cabana (providing protection for adults/children/pets from the sun and wind) by simply utilizing high flotation tires for easy movement on sand. With the solar panel/internal battery option, a place to plug in a cooler, fan, television, radio, tape player, electric air pump, etc. is made possible. The instant invention is also useful as a storage device when taken to the beach to hold towels, chairs and the like. While at the beach, everything may be loaded into the shelter and locked, such as while its users desire to walk along the beach.

An electrical system is provided within the camper/shelter which utilizes an electrical cord from a vehicle's lighter to the exterior of the shell, with the cord being plugged into a weatherproof inlet plug located on the lower exterior thereof. Within the camper/shelter, a fuse box is provided, along with electrical outlets for appliances. The electrical system includes a micro-chip comparitor which senses when a battery is being drained beyond a pre-set threshold, after which the comparitor shuts off the electrical system within the camper/shelter.

BRIEF DESCRIPTION OF THE DRAWINGS

The objects and features of the invention noted above are explained in more detail with reference to the drawings, in which like reference numerals denote like elements, and in which:

FIG. 1 illustrates a perspective view of a shelter/camper assembly according to the present invention while in an assembled position;

FIG. 2 illustrates a side elevational view of a shelter/camper assembly according to the present invention while in an open position;

FIG. 3 illustrates a side elevational view of the present invention while in a closed position;

FIG. 5 illustrates a side sectional view along line 5—5 in FIG. 1;

FIG. 6 illustrates a side planar view of a wheel assembly;

FIG. 7 illustrates a side sectional view along line 7—7 in FIG. 2;

FIG. 8 illustrates a side sectional view of a quick clip; and

FIG. 9 illustrates an end elevational view of the present invention secured to a car and partially supported from a hitch of the car.

DETAILED DESCRIPTION OF THE INVENTION

Figure 4:
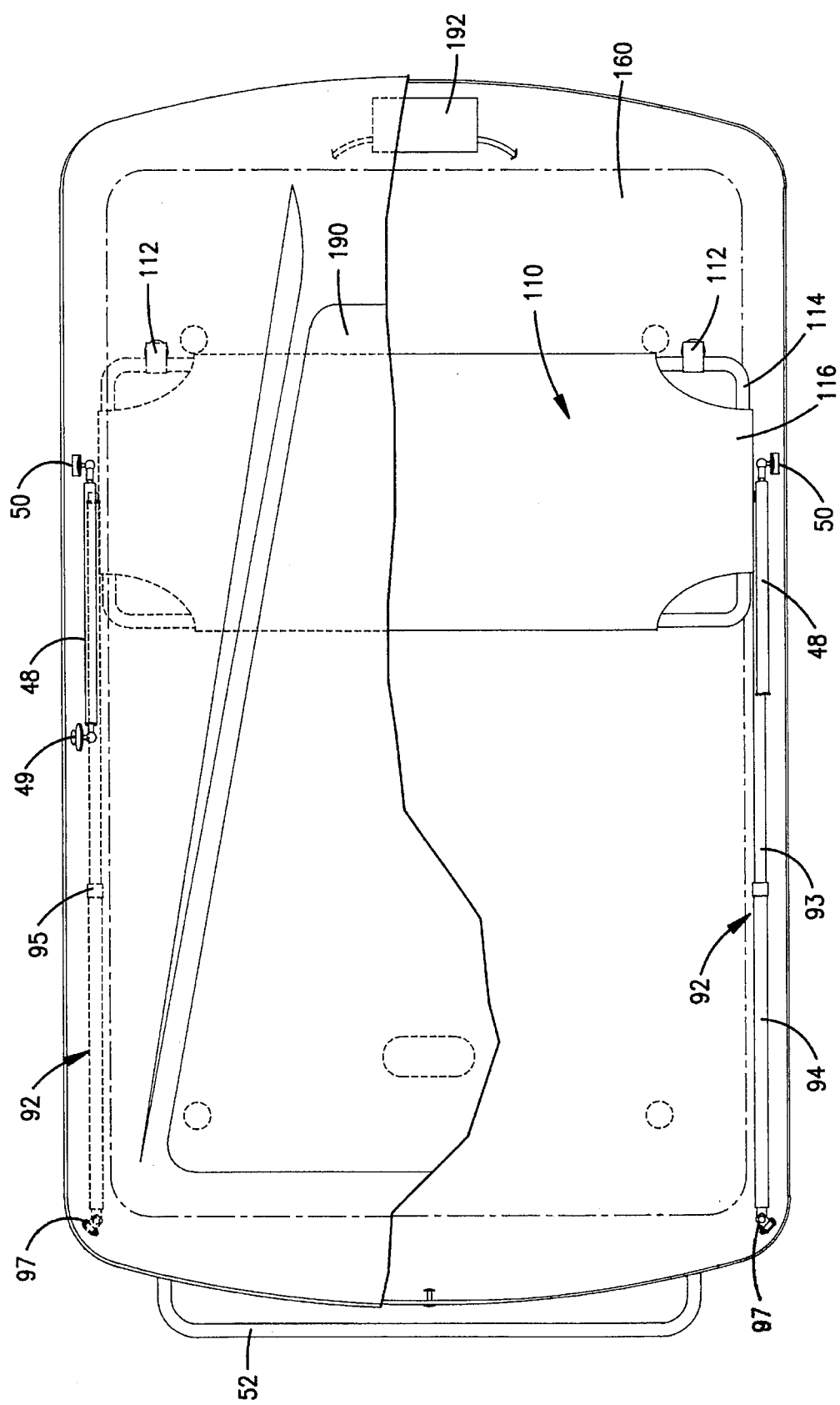
FIG. 4 illustrates a top planar view of the present invention.

FIG. 1 generally illustrates a shelter/camper assembly according to the present invention generally designated by the reference numeral 1. The shelter/camper assembly 1 includes rigid upper and lower shells 2 and 4, each of which includes a central body section 6 and 8. The upper and lower shells 2 and 4 may be constructed of reinforced fiberglass or plastic having sufficient strength and the like, so long as it provides a maintenance free, durable, aesthetically pleasing and long lasting outer shell. The respective body sections 6 and 8 are formed integrally with front, back and side flanges 10–13 and 14–17. The front, back and side flanges 10–13 of the upper shell 2 combine to form an outer rim 18, while the front, back and side flanges 14–17 of the lower shell 4 combine to form an inner lip 20 (FIG. 5). The outer rim 18 is constructed such that its inner perimeter snugly fits over and sealingly engages the inner lip 20. The upper and lower shells 2 and 4, when closed, create an aerodynamic exterior to minimize fuel usage.

The upper and lower shells 2 and 4 are removably secured to a flexible tent section 30 which includes front, back and side walls 32–35. The front and side walls 32–34 include openings 78–80 therethrough, each of which may serve as an entrance to the tent assembly. Each opening 78–80 is outlined with dual zipper assemblies 76. The dual zippers 76 enable separate netting and canvas or nylon covers 81 and 82 to be separately, or in combination, utilized to close respective openings 78–80. As illustrated in FIG. 1, the netting covers 81 are located outside the canvas covers 82. The screens are formed of No-See-Um netting and the like. The front, back and side walls 32–35 are integrally formed with one another and secured to the upper and lower shells 2 and 4 through zippers 40 (as illustrated in FIG. 5). As illustrated in FIG. 5, the lower shell 4 includes a lip 20 proximate its upper and outer edge which sealably engages the outer rim 18 when in a closed position (FIGS. 3 and 9). An interior surface of the lower shell 4 includes a layer of carpet 38 or a felt headliner adhesively secured thereto. A flexible linking member 42 is sandwiched between and secured to an outer edge of the carpet 38 and the interior of the lower shell 4. The linking member 42 surrounds the flanges 14–17 and includes a zipper 40 thereon that engages a zipper 41 which is secured to a bottom edge of the front, back and side walls 32–35 of the tent section 30. The tent section 30 may be constructed of nylon which is fire retardant, UV protected, weather resistant and water resistant and breathable. Other materials may be used for the tent section 30 so long as they provide these desirable characteristics. The zippers 40 and 41 engage to secure the tent section 30 to the lower shell 4. The top edge of the tent section 30 includes a similar zipper assembly which releasably secures the tent to the interior of the upper shell 2. The bottom perimeter portion of the tent section 30 further includes a shroud 44 sealably and permanently secured thereto at a point above the zipper 41. The shroud 44 surrounds the tent section 30 and maintains a water resistant seal therewith. The shroud 44 includes an outermost loop 36 which receives a shroud drawstring 46. Outer ends 47 of the drawstring 46 extend outward through an opening 43 in the shroud 44. A retaining ring 45 prevents slack within the outer ends 47 from passing through the opening 43, thereby securely holding the drawstring. As illustrated in FIGS. 1 and 5, when the upper shell 2 is opened, the shroud 44 may be folded over the upper edge and lip 20 of the lower shell 4. Once folded over the lip 20, the shroud drawstring 46 within the shroud 44 is tightened to maintain a secure relation between the shroud 44 and the lower shell 4.

Referring to FIG. 2, hinges 28 are located proximate, and secured to, the back flanges 11 and 15 of the upper and lower shells 2 and 4, respectively. The hinges 28 enable the upper and lower shells 2 and 4 to pivot with respect to one another between an open position (as illustrated in FIGS. 1 and 2) and a closed position (as illustrated in FIGS. 3 and 9). The rounded design of the hinge allows for more foot room once the shell is opened. The upper shell 2 opens to a relatively high angle to allow easy access and exit. The doors/windows are extremely large to increase exposure to the outdoors. Optionally, for cold weather camping, smaller openings or a single opening may be provided.

Turning to FIGS. 2 and 3, the shelter/camper assembly 1 further includes pneumatic cylinders 48 located at an intermediate point along the shells and secured to opposite sides of the upper and lower shells 2 and 4. The pneumatic cylinders 48 are pivotally connected at hinges 49 and 50 to support the weight of the upper shell 2 during opening and closing thereof. The pneumatic cylinders 48 further support the weight of the upper shell 2 when in use. The pneumatic cylinders 48 perform substantially all of the lifting force once the upper shell is opened a few inches.

A hanging cot 110 is securely affixed at hinges 112 to the interior of the upper shell 2. The cot 110 is constructed with a rectangular tubular cot frame 114 which is received within a cot support 116 along its four sides. The hinges 112 are secured to a rear section of the tubular bar 114. Support straps 118 are secured to a front portion of the cot frame 114. The straps 118 are adjustable in length to maintain the hanging cot 110 in a horizontal position (as illustrated in FIG. 2) when the upper shell 2 is open. The straps 118 are secured to the upper shell 2 proximate the hinges 49 to allow the pneumatic cylinder 48 to support partially the weight of the user.

The lower shell includes a transport bar 52 securely fixed to the front flange 14 of the lower shell 4. The bar 52 is constructed in a rectilinear manner and extends downward and forward of the front flange 14. As illustrated in FIGS. 3 and 6, the support bar 52 receives a portable wheel assembly 54 to carry one end of the shelter/camper assembly 1 when being manually moved. The portable wheel assembly 54 includes two wheels 56 rotatably mounted upon an axle 58. The axle 58 is further secured to a handle assembly 62 and a linking assembly 60. The handle assembly 62 facilitates lifting of the front end of the tent assembly 1, such as when being loaded onto the top of a vehicle. The linking assembly 60 includes a base section 64 which substantially supports the tent assembly 1 through the bar 52. The base 64 includes a flexible lip 66 on one end thereof which is movably displaceable from the base 64 to allow the support bar 52 to pass therebetween and rest within a support chamber 68. The flexible lip 66 further includes a hole 69 which receives a threaded bolt 70 which threadably engages the base 64, thereby securing the flexible lip 66 to the base 64 and retaining the support bar 52 within the support chamber set 68.

To facilitate the loading and unloading process, a removable handle 72 (FIG. 3) is attached to the tent assembly 1 at an end opposite the wheel assembly 54. The handle 72 includes a suction cup 74 which is vacuumously secured to the lower shell 4 when in use.

Referring to FIG. 1, a tent closure drawstring 84 is provided which surrounds partially a perimeter of the tent section 30 to enable a user to gather, indirectly, the front and side walls 32, 34 and 35 into the lower shell 4 as the upper shell 2 is being closed. The drawstring 84 passes through external loops 86 located along the outer surfaces of the side walls 34 and 35 proximate the front wall 32. The drawstring 84 also passes through the side wall openings 79 and 80, through internal loops 87 and is releasably secured to the back end of the lower shell 4 at the center 89 thereof. The drawstring 84 receives a tension ring 90 on an outer end thereof to gather excess slack in the drawstring 84. The drawstring 84 is somewhat elastic (as is the shroud drawstring 46). Prior to disassembly, the user pulls the drawstring 84 through the tension ring 90 to create and maintain tension within the drawstring 84. Next, the user closes the upper shell 2, the tensioned drawstring forces the side walls 34 and. 35 and the front wall 32 to collapse inward into and toward the center of the lower shell 4. Thus, the tent section 30 is self-contained within the lower shell 4 when closed.

Turning to FIGS. 2–4, the shelter/camper assembly 1 further includes stabilizing braces 92 proximate the front end thereof. Each stabilizing brace 92 is formed from inner and outer cylindrical tubes 93 and 94 which are joined at a securing ring 95. The inner tube 93 is received within the outer tube 94 and is slidable relative thereto when the securing ring is rotated in a first direction. When rotated in a second direction, the securing ring 95 produces a binding connection between the inner and outer tubes 93 and 94, thereby preventing linear movement with respect to one another. The lower ends of the outer tubes 94 are secured to outer front corners of the lower shell 4 through hinges 97 which afford at least two degrees of movement of the braces 92 relative to the floor. By way of example only, each hinge 97 includes a pair of vertically oriented parallel tabs 99 which may be fixedly or rotatably secured to the lower shell 4. The tabs 99 include holes which receive a pin. The pin is received within a clevis which rotates about the axis of the pin to afford rotation of the braces 92 in one direction. The clevises are pivotally bolted to the lower ends of the outer tubes 94, thereby affording pivotal movement of the braces 92 in a second direction perpendicular to the first direction of movement. In this manner, the braces 92 are moveable from a storage position (see FIGS. 3 and 4) along opposite sides of the lower shell, to one of two stabilizing positions (FIGS. 1 and 2). In the first stabilizing position, both braces 92 extend upward parallel to one another. In the second position, the braces criss-cross as in FIG. 1 to resist high wind. The braces may also be inverted with the clevises at the top and extended to the lower shell.

The upper ends of the inner tubes 93 are threadably received within ball joint assemblies 96 (shown in cross-section in FIG. 7). The ball joint assemblies 96 includes a pivotal cylindrical base 98 having a threaded recess for receiving either brace 92. The base 98 is formed integral with a circular head 100 which is permanently received within a foundation 102. The foundation 102 is embedded within the body of the upper shell 2. 10 The head 100 pivotally moves within the foundation 102 to enable either stabilizing brace 92 to be threaded therein. When in storage, the stabilizing braces 92 are disconnected from the upper shell 2 and placed within the lower shell 4.

As illustrated in FIG. 1, when assembled, the stabilizing braces 92 may be oriented in a criss-crossing configuration. To do so, the upper ends of the inner tubes 93 are merely aligned with the diagonally opposed ball joint assembly 96 and threadably secured thereto. This criss-cross structure provides a much stabler overall construction, such as in stormy environments. When in the criss-cross configuration, the side openings 79 and 80 may be used to afford access to the tent.

The upper shell 2 includes a locking mechanism 3 having an L-shaped pivot arm which is securely affix tea locking pin 5 (FIG. 5) within the lower shell 4 during transport. The locking pin 4 is permanently attached to front flange 14 of the lower shell 4. The locking mechanism requires a key once locked for added security.

The lock and key assembly described above allows a user to store camping equipment within the shell and lock it while leaving a campsite.

As illustrated in FIG. 2, the lower shell 4 includes a plurality of "quick clips" 120 located thereon and proximate support bars 122 of the cargo rack on the vehicle. The quick clips 120 are constructed to enable a single user to load the shelter/camper assembly 1 upon a vehicle. A quick clip 120 is shown in detailed cross-section in FIG. 8. Each quick clip 120 includes a wide base section 124 located proximate a closure section 126. The base and closure sections 124 and 126 are formed integrally with one another via a U-shaped link 128 and combine to form a receiving chamber 130. Forwardly facing ends of the base and closure sections 124 and 126 form a concave entry 132 to guide a corresponding support bar 122 through a gap 134 therebetween. As the support bar 122 enters the gap 134, the outer closure section 126 is displaced outward sufficiently to allow the bar 122 therethrough. The support bar 122 thereafter passes into the receiving chamber 130 in which it becomes trapped. At this point, the flexible U-shaped link 128 biases the outer closure section 126 inward to reengage the base section 124.

The base section 124 is securely fixed to the body of the lower shell 4 via an anchoring bolt 136. The anchoring bolt 136 includes a footer 138 on one end and a nut 140 on the opposite end. As the nut 140 is tightened, the anchoring bolt 136 securely affixes the base section 124 against the body of the lower shell 4. Once the support bar 122 is in place within the receiving chamber 130, a hand fastener 142 is inserted through the outer closure 126 and is threadably engaged within the core of the anchoring bolt 136o As the handle fastener 142 is tightened, the support bar 122 is secured in place.

FIG. 9 illustrates the shelter/camper assembly as installed upon a smaller vehicle, such as most non-station wagon type cars. When used with smaller vehicles, the lower shell 4 extends beyond the rearmost end of the vehicle cab, and hence beyond any cargo rack installed thereon. Therefore, a support bracket 170 is provided to support the end of the tent assembly projecting over the vehicle trunk (shown in dashed lines). The bracket 170 is constructed from a tubular frame 172 formed in a tear-drop shape with a flat upper bar portion 174. Opposite end portions 176 and 178 of the bar 174 extend downward in a curved manner until they join one another to form a straight base portion 180. The base portion 180 is hollow and is received over a lower rod which is secured to, and extends upward from a square hitch extension 182. The square hitch 182 is secured to the hitch or bumper or undercarriage of the vehicle. The hitch 182 can also receive a hitch assembly so a trailer can be toward. The flat bar portion 174 is constructed with a diameter substantially equal to that of the support bars 122, in order to be securely received within corresponding quick clips 120 as explained above.

A ladder 150 may be positioned along either side or at the front of the tent assembly.

Turning to the installation of the shelter/camper assembly, each of the handle screws 142 is initially removed to enable the outer closure sections 126 of each quick clip 120 to loosely hang downward from the bottom of the lower shell 4. To effect loading, a user attaches the suction handle 72 to the rear end of the shelter/camper assembly (which is at the front of the vehicle) (FIG. 3) and the wheel assembly 54 to the front end thereof (rear of vehicle). Next, the shelter/camper assembly 1 is easily maneuvered to a position adjacent the rear end of the vehicle and erected in a vertical position. Thereafter, a user may lift and push the shelter/camper assembly up onto the rear end of the vehicle by using the handle bar 62. As the user maneuvers the shelter/camper assembly 1 forward along the top of the vehicle, it is ultimately placed in a horizontal position with each row of clips 120 aligned proximate the corresponding support bar 122. Thereafter, the user slides the shelter/camper assembly forward along the bars 122 thereby effecting contact between the convex sections 132 of each quick clip 120 and the corresponding support bar 122. As this engagement is pursued, each outer closure section 126 is displaced to allow the support bar 122 to pass into the receiving chamber 130 as its final resting position. Thereafter, the user inserts the hand fasteners 142 to quickly and easily secure the support bars 122 to the shelter/camper assembly 1.

At an appropriate time during the loading operation, the suction handle 74 and the wheel assembly 54 may be removed. After the wheel assembly 54 is removed, the handlebar 52 may be used to maneuver the shelter/camper assembly to a desired position.

When it is desirable to open the shelter/camper assembly 1, the user installs the ladder 150 in the appropriate location and unlocks the locking mechanism 3. Once unlocked, the upper shell 2 may be lifted to an open position (as illustrated in FIGS. 1 and 2). The pneumatic cylinders 48 effect this opening operation once opened a few inches. Initially, the zippers 76 may be opened to afford access to the interior of the tent. Once the upper shell 2 is open, the user secures the stabilizing braces 92 in a desired configuration and secures the upper ends thereof to corresponding ball joint couplers 96. As explained above, the stabilizing braces 15 92 are secured at a desired length by rotating the inner and outer tubes 93 and 94 in opposite directions to effect a binding engagement within the securing rings 95. The stabilizing braces 92 are secured to corresponding ball joint couplers 96 in a threaded manner. Once the stabilizing braces 92 are inserted, the shelter/camper assembly is self-supporting.

The shroud 44 is unfolded and positioned to overlap the upper edge of the front, back and side flanges 14–17 of the lower shell 4. Once in this position, the drawstring 46 is tightened and the slip ring 47 is used to affix securely the shroud 44 to the exterior of the lower shell 4. As explained above, the shroud 44, when in this position, shelters the zippers 40 and 41 from rain and other elements, thereby preventing leakage. If the hanging cot 110 is to be used, the straps 118 may be adjusted, as desired, to orient the hanging cot 110 at a level position. To close the shelter/camper assembly after use, the drawstring 46 and tension ring 47 are released to enable the shroud 44 to be folded into the lower section 4 proximate the bottom exterior portion of the tent section 30. The stabilizing braces 92 are threadably disengaged from the ball joint couplers 96 in the upper shell 2. The inner and outer tubes 93 and 94 are rotated to disengage the securing rings 95 and closed upon one another for storage. The stabilizing braces 92 are thereafter laid within the lower shell 4 in a storage position. The tension ring 90 is slid up the elastic drawstring 84 to produce tension upon opposite side walls 34 and 35 of the tent section 30. As the upper shell 2 is lowered, the tension within the drawstring 84 causes the tent section to collapse inward upon itself and remain within the upper and lower shells 2 and 4.

The entire foregoing process for setting up the tent assembly is extremely quick and may be done in approximately one minute.

When it is desirable to remove the tent section 30 to use the upper and lower shells 2 and 4 as a cargo carrier, the zippers 40 and 42 merely need be unzipped thereby completely releasing the front, back and side walls 32–35 of the tent section 30. The hanging cot 110 may also be removed by removing the hand fasteners 142 from the hinges 112 and by removing the securing straps 118. Once the tent section 30, the hanging cot 110 and the mattress 24 are removed from the upper and lower shells 2 and 4, these shells may be utilized for storage as a cargo area.

As a further option, the exterior surface of the top shell 2 may be constructed with a solar panel 190 thereon (see FIGS. 4 and 9). The solar panel 190 may be utilized to charge a battery within the vehicle, or to charge a separate battery 192 in the shelter/camper assembly, to provide an extended power source while camping. The battery may be utilized to run portable equipment within the tent or outside the tent (e.g. a fan, a light, a T.V., a radio, and the like). This same equipment may be powered through the vehicle's battery by merely utilizing the electrical system described as follows.

The current power source is an electrical package which plugs into the lighter of a vehicle on one end and into a marine grade plug on the lower shell of the invention to afford electrical power for a dome light, a reading light, accessories and the like. Within the lower shell, a microprocessor is provided in series with the electrical cord to sense significant drops in the amperage and voltage supplied from the vehicle battery. When the sensed voltage and/or amperage drop below threshold levels, the microprocessor determines that the vehicle battery has reached its minimum charge necessary to restart the vehicle. Accordingly, the microprocessor shuts off the power supply to the lights and accessories within the tent assembly.

The foregoing assembly is useful on a variety of vehicles, such as vans, mini-vans, RVs, fifth wheel trailers and the like. The foregoing assembly is also useful upon boats, upon the beach, and upon stationary shelter structures. In short, the instant assembly may be set up upon the ground or upon any structure having a conventional rack assembly capable of receiving the quick clamps.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A portable, collapsible shelter/camper/storage unit comprising:
    upper and lower shells, each having a body section formed with front, back and side flanges projecting toward, and aligned with corresponding front, back and side flanges of the opposed shell;
    means for pivotally securing said back flanges to one another such that said upper and lower shells form a V-shape when erected to an open position, said front, back and side flanges of said upper and lower shells having respective downwardly and upwardly directed rims which meet in a sealing relation when said upper and lower shells are closed;
    a flexible tent section having front, back and side walls with top and bottom edges spanning an opening between said upper and lower shells; and
    a displaceable clip, permanently secured to an exterior surface of said body section of said lower shell, for releasably securing said shelter/camper/storage unit to a supporting structure.

2. A portable, collapsible shelter/camper/storage unit, according to claim 1, further comprising a water resistant shroud assembly surrounding and being sealably secured to said front, back and side tent walls located proximate said bottom of said tent portion, said shroud being foldably secured over said upwardly directed rim of said lower shell to seal said seam from an external environment.

3. A portable, collapsible shelter/camper/storage unit according to claim 1, wherein said displaceable clip further comprises:
    a base footer securely fixed to said exterior surface of said lower shell;
    a closure, connected to and movably displaceable from said base footer for receiving said supporting structure therebetween; and
    a linking saddle for movably connecting said base footer to said closure and for forming a receiving chamber to hold the supporting structure, said closure having a hole therethrough for receiving a pin which secures the closure to the base footer.

4. A portable, collapsible shelter/camper/storage unit according to claim 1, further comprising stabilizing braces having a base end pivotally secured to an interior of said lower shell proximate said front flange thereof and receptacles pivotally secured to an interior of said upper shell proximate said front flange thereof, said stabilizing bases having an outer end securable to diagonally spaced receptacles to form a criss-cross rod support configuration.

5. A portable, collapsible shelter/camper/storage unit according to claim 1, further comprising a tie strap extending across said front wall and along at least front portions of said side walls, said tie strap directing said front and side walls of said tent into an interior of said upper and lower shells when closed.

6. A portable, collapsible shelter/camper/storage unit according to claim 1, wherein said front, back and side walls are removable to enable the upper and lower shells to be used as a cargo carrier.

7. A portable, collapsible shelter/camper/storage unit according to claim 1, further comprising a bar secured on one end thereof,
    portable wheels removably secured to said bar; and
    a handle removably secured to said shells at a point remote from said wheels to facilitate transport, loading and unloading of said assembly.

8. A portable, collapsible shelter/camper/storage unit, according to claim 1, further comprising:
    a support bracket extending downward from a rear end of the lower shell to a square hitch, said square hitch secured to, and extending rearward from one of a hitch and a bumper of a vehicle, said support bracket including an upper end extending across a width of the low shell to provide support therefore.

9. A portable, collapsible shelter/camper/storage unit comprising:
    upper and lower shells, each having a body section formed with front, back and side flanges projecting toward, and aligned with corresponding front, back and side flanges of the opposed shell;
    means for pivotally securing said back flanges to one another such that said upper and lower shells form a V-shape when erected to an open position, said front, back and side flanges of said upper and lower shells having respective downwardly and upwardly directed rims which meet in a sealing relation when said upper and lower shells are closed;
    a flexible tent section having front, back and side walls with top and bottom edges spanning an opening between said upper and lower shells; and
    pneumatic cylinders spaced along and secured to opposite sides of said upper and lower shells to support partially said upper shell while in an open position.

10. A portable, collapsible shelter/camper/storage unit according to claim 9, wherein said removable securing means includes a zipper for zipping said tent section to said footer.

11. A portable, collapsible shelter/camper/storage unit comprising:
    upper and lower shells, each having a body section formed with front, back and side flanges projecting toward, and aligned with corresponding front, back and side flanges of the opposed shell;
    means for pivotally securing said back flanges to one another such that said upper and lower shells form a V-shape when erected to an open position, said front, back and side flanges of said upper and lower shells having respective downwardly and upwardly directed rims which meet in a sealing relation when said upper and lower shells are closed;

a flexible tent section having front, back and side walls with top and bottom edges spanning an opening between said upper and lower shells;

means for removably securing said top and bottom edges of said front, back and side walls of said tent section to corresponding front, back, and side portions of said upper and lower shells; and a flexible footer securely affixed to said front, back and side flanges of said lower shell and being releasably secured to said tent section through said securing means.

12. A portable, collapsible shelter/camper/storage unit comprising:

upper and lower shells, each having a body section formed with front, back and side flanges projecting toward, and aligned with corresponding front, back and side flanges of the opposed shell;

means for pivotally securing said back flanges to one another such that said upper and lower shells form a V-shape when erected to an open position, said front, back and side flanges of said upper and lower shells having respective downwardly and upwardly directed rims which meet in a sealing relation when said upper and lower shells are closed;

a flexible tent section having front, back and side walls with top and bottom edges spanning an opening between said upper and lower shells; and a pull-down cot suspended from an interior of said upper shell.

13. A portable, collapsible shelter/camper/storage unit according to claim 12, wherein said pull-down cot further comprises a tubular bar forming a rectangular outline of said bed, a mattress suspended from and within said tubular bar, said tubular bar having a back side rotatably coupled to an interior of said upper shell and a front side secured to straps for retaining said bed in a level position while said shells are open.

14. A portable, collapsible shelter/camper/storage unit comprising:

upper and lower shells, each having a body section formed with front, back and side flanges projecting toward, and aligned with corresponding front, back and side flanges of the opposed shell;

means for pivotally securing said back flanges to one another such that said upper and lower shells form a V-shape when erected to an open position, said front, back and side flanges of said upper and lower shells having respective downwardly and upwardly directed rims which meet in a sealing relation when said upper and lower shells are closed;

a flexible tent section having front, back and side walls with top and bottom edges spanning an opening between said upper and lower shells; and a solar panel installed upon an exterior of said upper shell for converting solar power to electricity, and a battery for storing said electricity.

* * * * *